Patented Feb. 20, 1940

2,190,656

UNITED STATES PATENT OFFICE 2,190,656

INSECTICIDE

Fred W. Fletcher, George E. Lynn, and Frank B. Smith, Midland, Mich., assignors to The Dow Chemical Company, Midland, Mich., a corporation of Michigan No Drawing. Application February 14, 1939,
Serial No. 256,316

5 Claims. (Cl. 167—30)

This invention relates to insecticidal materials, and particularly to compositions in which a reaction product of pinene and diphenyloxide is employed as a toxic ingredient.

Many synthetic organic materials have been suggested for use as insecticidal toxicants and as substitutes for pyrethrum, rotenone, and other natural occurring products. Almost without exception these toxicants are injurious to plant foliage so that their use must be carefully controlled both with respect to amounts and concentrations employed and time of application. A further disadvantage accruing to many of the synthetic toxicants heretofore employed has been their toxicity to humans and their incompatibility with other common insecticidal materials.

Diphenyloxide has been suggested as an insecticidal toxicant but has proven unsatisfactory because of its relatively low toxicity whereby such large amounts thereof are required to accomplish insect control as produce severe injury to plant foliage. Lower concentrations within the tolerance of growing vegetation are substantially ineffective against insects.

We have discovered that the reaction products of pinene and diphenyloxide are very effective as insecticidal toxicants and that compositions comprising these products may be applied to growing foliage according to standard spraying and dusting procedure without causing injury thereto. Any suitable amounts of these materials may be employed, from about 1 to about 20 per cent by weight of the toxicant in the composition being preferred. Advantages in the use of these reaction products are that they are liquid, readily dispersible in water, soluble in most organic solvents, readily absorbed by common finely divided diluents, substantially non-toxic to humans, and effective solvents and solubilizing agents for other organic insecticides.

The new condensation products which we employ as insecticidal toxicants may be prepared by reacting diphenyloxide with pinene or turpentine in the presence of an activated bleaching earth catalyst such as those sold under the trade names "Retrol", "Tonsil", "Afton Clay", etc. The reactants may be employed in any desired proportions to obtain products of varying physical and chemical characteristics. Ordinarily from about 0.4 to 2.0 parts by weight of turpentine or pinene per part of diphenyloxide is employed, the reaction being carried out in the presence of from 1 to 10 per cent by weight of the bleaching earth catalyst based on the diphenyloxide. The reaction is carried out by adding the turpentine or pinene to a mixture of the diphenyloxide and catalyst and thereafter heating and stirring the mixture at temperatures between 150° and 250° C. until the condensation is complete. Although the reaction may be carried out in an atmosphere of carbon dioxide, nitrogen, or other inert gas to avoid oxidation and polymerization of the pinene, this is not required. Upon completion of the reaction, the crude product is filtered to remove the catalyst and may be fractionally distilled to obtain particular fractions of the condensation product. The products of the condensation probably consist of complex pineyl-diphenyloxide structures. In practice, turpentine is generally employed as a source of pinene and a substitute therefor in carrying out the reaction. Ingredients other than pinene in the turpentine do not interfere with the reaction or the insecticidal toxicity of the resultant product.

While the crude reacted mixture may be distilled and any desired fraction employed as indicated, a particularly valuable insecticidal prodcut has been found to be the residue obtained by "stripping off" low boiling reaction products, unreacted diphenyloxide, pinene, etc., boiling below 160° C. at 20 millimeters pressure. The residue is a mobile, straw-colored liquid well adapted for use as an insecticidal toxicant. The products and useful fractions obtained as described above are for the most part viscous liquid mixtures distilling above about 160° C. at 20 millimeters pressure and ranging in specific gravity from between about 0.93 to 1.03 at 25°/25° C.

These new toxicant materials may be employed in different types of compositions to accomplish insect control. The determining factors with respect to the particular adaptation employed are the type of insect to be controlled and the circumstances under which such control is to be accomplished. For example, these pinene-diphenyloxide condensation products may be employed as toxicants in oil emulsions. They may also be employed in water suspension with or without an additional emulsifying or dispersing agent. If desired, they may be absorbed in or adsorbed on finely divided carriers such as diatomaceous earth, bentonite, talc, wood flour, and the like, to obtain compositions adapted to be employed either as dusts or in water suspension. A further modification consists of dissolving the toxicant in any suitable organic solvent such as alcohol, liquid chlorinated hydrocarbons, pine oil, fatty acid glycerides, and the like, and thereafter employing the solution or mixture either alone or in suitable composition.

The products may be incorporated in other standard type insecticidal compositions, either as the sole toxic ingredient of such composition or in combination with common insecticidal materials such as lead arsenate, pyrethrum, rotenone, organic thiocyanates, and related compounds.

The following examples are illustrative both with respect to the fractions of condensation product employed and composition types, but are not to be construed as limiting the invention.

Example 1

Equal parts by weight of turpentine and diphenyloxide were reacted together at 175°–225° C. and over a period of four hours in the presence of an activated bleaching earth as catalyst. The resultant crude product was distilled, whereby there was obtained the following pinene-diphenyloxide condensation fractions.

| Fraction | Boiling point at 20 mm. pressure | Specific gravity |
|---|---|---|
| | °C. | |
| A | 175–200 | 0.939 at 25°/25° C. |
| B | 200–230 | 0.972 at 25°/25° C. |
| C | 230–260 | 1.024 at 25°/25° C. |
| D | Above 260 | 1.026 at 20°/20° C. |

Aqueous emulsions were prepared by homogenizing 1, 5, 10, and 20 percent by weight of fraction B with a 0.25 per cent sodium caseinate-water solution. These compositions were sprayed on aphis-infested plants and trees. Each application resulted in a 100 per cent kill of the insects, the tests being carried out on roses, carnations, and poplar trees. There was no apparent injury from any application. Trees and plants sprayed with the caseinate solution alone continued to show heavy aphis infestation.

Example 2

A number of samples of white wool cloth were saturated with a 10 per cent solution of fraction B (as shown in Example 1) in methyl ethyl ketone and allowed to dry. 5 larvae of the black carpet beetle were placed on each dried sample. Each sample was then placed in a closed cardboard box, incubated at 80° F. over a period of three weeks, and thereafter examined to determine the amount of feeding or other attack directly attributable to the beetle larvae. Simultaneous tests were made with larvae upon untreated samples of this cloth. Examination of incubated samples impregnated with the pinene-diphenyloxide condensation product fraction showed that after three weeks the cloth was undamaged by the larvae. The untreated controls showed heavy feeding at the end of three weeks' incubation. Tests carried out over the same period upon wool cloth treated with methyl ethyl ketone alone showed heavy feeding at the end of the three-week period. The compound caused no noticeable staining or oiliness of the treated fabric.

Example 3

80 parts by weight of diatomaceous earth was impregnated with 20 parts of fraction B (described in Example 1). The resultant mixture was a fine dust-like composition dry to the touch. Various amounts of this composition were suspended in water and sprayed on living foliage infested with the fall web worm and walnut worm. Against the fall web worm, 4 pounds per 100 gallons of the composition was found to be 80 per cent effective and to be the equivalent of lead arsenate at 3 pounds per 100 gallons. Against walnut worm, 3 pounds per 100 gallons controlled 100 per cent of the larvae and was the equivalent of lead arsenate at an equal concentration.

Other tests were carried out with this composition to determine its effectiveness as a stomach poison against such representative insects as the potato beetle and southern army worm. At 3 pounds per 100 gallons, the composition was 76 per cent effective, whereas 3 pounds of lead arsenate controlled 87 per cent of the beetles. Against southern army worm, 4 pounds per 100 gallons of the composition gave an 80 per cent control while 3 pounds of lead arsenate per 100 gallons was 70 per cent effective.

In each of the foregoing tests, the aqueous suspension was applied to living foliage infested with the test insect or larva. The foliage showed no burning or other injury attributable to the toxicant employed.

Example 4

Tests were carried out with 2 per cent by weight dispersions of fraction A (as shown in Example 1) in a 0.25 per cent aqueous sodium oleate solution against red spider. The applications were made to spider-infested cotton plants and observations made four days following spraying. No injury was shown by the plants so treated and a 100 per cent kill of red spider resulted. It was also found that no spider eggs hatched over this period. Untreated check plants continued to show heavy spider infestation and a decided build-up of population due to the hatching of eggs.

Example 5

A mixture of equal parts by weight of fractions B and C (as shown in Example 1) was employed to prepare a 1 per cent by weight dispersion of the pinene-diphenyloxide condensation product in a 1 per cent sodium oleate-water solution. This composition was applied to mature chrysanthemum plants badly infested with brown chrysanthemum aphids. Inspection of the plants two days following the application showed a 94 per cent control of the insects and no injury to foliage. No dead aphids were found on unsprayed control plants which continued to be badly infested.

Example 6

In a similar manner, a 1 per cent dispersion of fraction C (as shown in Example 1) was prepared in sodium oleate solution. When applied to chrysanthemum plants as described in Example 5, a 93 per cent kill against aphids was observed without injury to the plant.

Example 7

A similar determination was carried out with fraction D, the residue boiling above 260° C. (as shown in Example 1). A 1 per cent dispersion of this compound in 1 per cent sodium oleate solution killed 100 per cent of the aphids infesting the chrysanthemum plants without in any way injuring the foliage thereof.

Example 8

A mixture of 340 grams of diphenyloxide and 20.4 grams of Retrol was heated at a temperature of approximately 200° C. until all of the residual water contained in the Retrol had been driven off. 286 grams of crude turpentine was then added gradually with stirring over a period of four hours, during which time an atmosphere of nitrogen was maintained in the flask. Upon completion of the reaction, the mixture was cooled to approximately 150° C. and filtered while hot to remove the catalyst. The crude product thus obtained was a fluorescent yellow liquid which was fractionally distilled under vacuum to remove unreacted diphenyloxide and pinene and reaction products boiling up to 160° C. at 20 millimeters pressure. The residue so obtained was a relatively mobile liquid having a specific gravity of 1.015 at 24°/16° C. and a refractive index of 1.5569$^{25}$. Approximately 80 per cent of this residue was found to boil below 270° C. at 5 millimeters pressure. This residue was incorporated in aqueous dispersions and with diatomaceous earth, substantially as described in the foregoing examples, and found to give commercial control of common insect pests. The product may also be employed to replace wholly or in part petroleum distillate fractions commonly used in oil emulsion compositions, whereby improved control of insects and reduced injury from the application of such spray compositions results. The product may also be incorporated in amounts ranging between 1 and 10 per cent into such diluents as walnut shell flour, redwood flour, and the like, and the composition so obtained employed according to standard dusting procedure for the control of such pests as citrus red mite, black scale, and the like.

The condensation products described in the foregoing examples were also tested in combination with such representative organic insecticides as 2.4-dinitro-6-cyclohexyl-phenol and rotenone and found compatible therewith. The pinene-diphenyloxide condensation products were found to fortify and supplement the action of and to serve as solvents and solubilizing agents for these and related compounds.

Other modes of applying the principle of our invention may be employed instead of those explained, change being made as regards the materials or their amounts employed, provided the ingredients stated by any of the following claims or their equivalent be employed.

We therefore particularly point out and distinctly claim as our invention:

1. An insecticidal composition containing as a toxic ingredient a liquid reaction product of pinene and diphenyloxide.

2. An insecticidal composition containing as a toxic ingredient a liquid reaction product of turpentine and diphenyloxide.

3. An insecticidal composition comprising diatomaceous earth and a liquid reaction product of turpentine and diphenyloxide.

4. An insecticidal emulsion comprising a liquid reaction product of turpentine and diphenyloxide.

5. A composition of matter adapted to be employed as an insecticidal toxicant consisting of the reaction product of turpentine and diphenyloxide from which all materials boiling below 160° C. at 20 millimeters pressure have been removed.

FRED W. FLETCHER.
GEORGE E. LYNN.
FRANK B. SMITH.